May 5, 1970    M. PARTIOT    3,510,239

DIRECTIONAL RADIANT HEATERS

Original Filed Feb. 3, 1965    3 Sheets-Sheet 1

INVENTOR
Maurice Partiot

BY Hall, Pollock & Vande Sande
ATTORNEYS

INVENTOR
Maurice Partiot

3,510,239
DIRECTIONAL RADIANT HEATERS
Maurice Partiot, 12 Rue du Plateau, St. Antonine, Le Chesnay, Yvelines, France
Continuation of application Ser. No. 430,129, Feb. 3, 1965, which is a continuation-in-part of application Ser. No. 334,842, Dec. 31, 1963. This application Apr. 18, 1966, Ser. No. 549,114
Int. Cl. F23d *13/12*
U.S. Cl. 431—328       20 Claims This application is a continuation of my U.S. application Ser. No. 430,129, filed Feb. 3, 1965 now abandoned which, in turn, is a continuation-in-part of my copending U.S. application Ser. No. 334,842, filed Dec. 31, 1963 now abandoned in favor of U.S. application Ser. No. 549,121, filed Apr. 18, 1966, for Deep Combustion Radiant Burners, which is a continuation-in-part of my U.S. application Ser. No. 36,767, filed June 17, 1960 for Deep Combustion Radiant Surfaces with Special Slotting (now U.S. Pat. No. 3,179,155).

This invention relates to novel radiant ceramic grids, blocks, or plates and in particular refers to such blocks together with burner structures for positioning and holding such blocks in positions which are effective to enhance the radiation of infra-red energy from such blocks and also relates to novel reflector means for use with such blocks and burners.

As the prior art has evolved, improved blocks have been devised which provide for a very substantial increase in the throughput of the combustible gas mixture to the combustion surface of the block. This has been accomplished by very greatly increasing the aggregate port area of the block. For example, in the British Pat. No. 6,312 to McCourt of 1915, the aggregate port area was about twelve percent, while the more modern ceramic blocks have an aggregate port area which varies in the range of about thirty-five to forty-five percent of the total block area. Of course, such an increase in the aggregate port area means that there is a corresponding decrease in the emissive ceramic surface between the passages of the block. Thus, whereas the cumulative surface between the passages was as much as eighty-eight percent in the radiant block disclosed in the McCourt British patent, this has been reduced to a value of only about fifty-five percent to sixty-five percent of the total block area in the more modern type of blocks previously referred to.

The increase in the throughput of the gas to the combustion surface has the effect of substantially increasing the temperature at such combustion surface and this necessarily increases the amount of radiation in accordance with the fourth power of the increase of temperature relative to zero degrees absolute temperature. However, the amount of infra-red radiation in the direction normal to the combustion surface has remained comparatively low because of the great increase in the aggregate port area at the expense of the cumulative emissive area between the passages or ports. It is well known that in the conventional blocks of the prior art, combustion does take place not only at the outer combustion surface of the block but also to a very limited degree at the tip ends of the passage walls which open into the combustion surface. As a result, the side walls of the passage do become radiant at their very tips where they emerge into the combustion surface. Such radiant port tips provide a small additional amount of radiant energy which is directed at an acute angle to the normal with the combustion surface of the block.

One of the aspects of this invention is the provision of radiant ceramic blocks or grids having a plurality of grooves, cavities, or indentations in the combustion surface and with a plurality of the small through passages opening into each such groove, indentation, or cavity, thereby providing a radiant surface in which a considerably greater amount of radiant energy is issued from the combustion surface of the block or grid. With such blocks or grids, there is also a considerable increase in the amount of radiation which is at an acute angle to a perpendicular with the block's combustion surface, said increase being in its greatest part provided by the open wall surfaces of the passages defined above the bottom level of said indentations.

The upstanding or sloping walls of the indentations and the intervening raised areas in the path of the flame have a higher temperature and consequently a greater emissive power than the bottom portions of the indentations. Therefore, the form and extent of the upstanding walls together with their disposition relative to the disribution of passages are of relatively great importance in the formation of a selective radiation pattern, a greater importance than would be indicated by the actual respective areas of such sloping or upstanding walls facing, for example, in two cross directions. It is one of the features of this invention to utilized such characteristics in order to produce a radiant plate having directional beam characteristics and for using such plates in combination to produce heaters having directional characteristics as well.

In some embodiments of the invention, the relative dispositions of the passage and of the raised areas are such that a blanket of burned gases is formed over the zone of combustion of the flame taking place at or adjacent the bottom levels of the indentations. The effect of this is to make the overall plate temperature more even and to raise the overall radiation output of the bottom portions of the cavities or indentations as well as to overheat them by mutual radiant action of the sidewalls of the indentions. The result is an overall increased temperature and radiant efficiency, while the useful selective directional or angle effect of the maximum radiation is maintained to a great extent.

When such blocks are used with burners and reflectors of the type disclosed herein, there is an improved exchange of heat between the combustion flame and the ceramic and a substantially increased intensity of radiation in the principal axis of the burner combination. In general, this is accomplished by using grids or blocks of the type just described in burner assemblies which are so constructed that the radiant block is positioned with its combustion surface at an angle other than perpendicular to the direction of the subject to be heated. With such a combination, one of the two symmetrical lobes of maximum radiation intensity is directed toward the subject to be heated and the reflector portion of the burner is then located so as to be in the path of the other of the two symmetrical lobes and to reflect such radiation in turn toward the subject to be heated with the result that there is a very great increase in intensity of radiation aimed at the subject to be heated. The lobes can also be made non-symmetrical so that the largest lobe is directed towards the subject to be heated.

Another object of the invention is to provide radiant blocks or grids for combustion of a gaseous mixture in which the combustion surface defines indentations of such a type that radiations in one direction parallel to the opposite ends of the combustion surface of the block are increased at the expense of radiations in the direction at right angles to that just mentioned.

A further object of this invention is to make a radiant block in which the ridges that are designed parallel to one side of said block are higher above the bottom of intervening indentations than are ridges parallel to the sides adjacent to the first one or than are ridges designed at any cross angle with the first one.

Still another object of this invention is to provide different levels of the combustion in which the lower indentations levels radiate heat to each other for the purpose of over-heating the plate surface by being bottled up at said lower level.

Still another object of this invention is to provide repeatedly stepped radiant surfaces which make it advantageous to use said surface at an angle with the object to be heated, and to use to best advantage the transverse radiations issuing from said steps.

Another object of the invention is to control the shape of the radiation pattern so as to obtain an apple-shaped radiation curve of which at least one lobe has a maximum length at an angle from the perpendicular to the general plate direction.

Still another object of this invention is to combine said maximum pattern with means to angle said plate with respect to the main direction of the burner body and with a reflector to further enhance the radiation impact in the desired direction.

Still another object of this invention is to make a radiant block or grid having indentations or cavities in its combustion surface which have such a profile that an asymmetrical pattern of the radiation results.

Still another object of the present invention is to provide an assembly of a plurality of radiant blocks or grids disposed at a mutual angle to each other so that their directed side wall radiations will heat each other so as to further increase their radiant efficiency and radiant output.

In describing the invention in further detail, reference will be made to the accompanying drawings in which.

FIGS. 7–11 comprise graphical representations of the radiation intensity patterns obtainable with the radiant burners of this invention.

In addition to my various patents and patent applications listed above, I am the applicant in other patents and applications which disclose radiant gas burners and plates therefor. In my prior patents and patent applications, the disclosed radiant plates embody combustion surfaces which are indented or have alternate upper and lower portions, and the plates may, if desired, be used in combination with auxiliary means such as refractory or metallic screens, means for maintaining the burnt gases in proximity to the combustion surface, and/or radiation reflectors designed to fulfill a specific purpose and function. The additional patents and patent applications, over and above those listed previously herein, comprise U.S. Ser. No. 821,038 filed June 17, 1959 (now abandoned), and the cognate French Pat. No. 1,206,247; U.S. Ser. No. 440,465, filed Mar. 17, 1965, now U.S. Pat. 3,321,000 granted May 23, 1967, comprising a division of my aforesaid Ser. No. 36,767 and now issued as U.S. Pat. No. 3,179,155 on Apr. 20, 1965; U.S. Ser. No. 354,508 filed Mar. 23, 1964 and now issued as U.S. Pat. No. 3,298,188 on Dec. 13, 1966 and comprising a continuation of my U.S. Ser. No. 43,803 filed July 19, 1960 and now abandoned; U.S. Ser. No. 43,802 filed July 19, 1960 and now abandoned; and copending U.S. Ser. No. 549,121 filed Apr. 18, 1966 and comprising a continuation of Ser. No. 334,842 filed Dec. 31, 1963; and also copending U.S. application Ser. No. 571,294, filed Aug. 9, 1966, abandoned in favor of application Ser. No. 742,980, filed June 27, 1968.

According to the invention, the principal radiation axis of the burner is not normal to any radiant surface as it is in all of the prior art, but it is at an acute angle with the general plane of said surface; it is directed toward a definite spatial area located ahead of said burner, and said principal axis of said burner coincides with the preferred direction of said selected area. The acute angle disposition of the radiant surfaces as to the usual normal angle disposition of plates in burners such as are described in Schwank's U.S. Pat. 2,832,331 constitutes one of the major departures of the invention from the generally accepted prior art in which the radiant normal surfaces are plain flat foraminous members.

Figure 1:
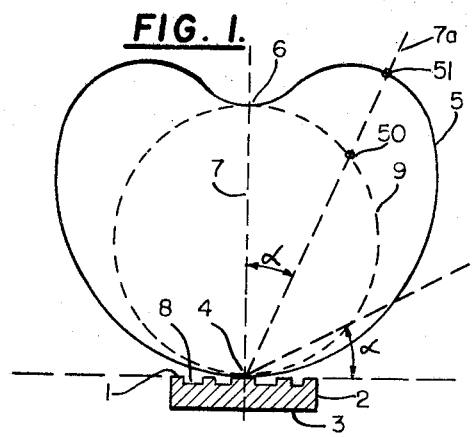
FIG. 1 shows a radiant grid or block and an associated two-lobe curve defining the intensities of radiant emissions at various angles in front of the radiant surface of the plate in accordance with one aspect of the invention.

In FIG. 1, a radiant surface 1 radiates infra-red energy from a ceramic plate or block 2 which is constructed with a great multiplicity of very small-bore cylindrical through passages extending therethrough from a bottom surface 3 toward the upper surface 1 where the combustion occurs. In virtually every direction from the upper radiant surface 1 there is an emission of infra-red and red rays whose intensity at some predetermined value is represented at each angle to the surface by a point at a measured distance from the point 4. The locus of all such points of predetermined measured intensity constitutes a surface 5 which is somewhat similar to that of an apple in that it has a depression at its center 6 which lies along the axis 7 perpendicular to the plate 2 at the point 4. It should be noted that the plate 2 is of the type having a plurality of cavities, grooves, or indentations defined in its upper surface 1 as at 8, for example, thereby providing a plurality of surfaces which form a substantial angle with the plane of the upper surface 1 and thus radiate infra-red energy in substantial quantity at a direction other than parallel to the axis 7 which is perpendicular to the upper surface 1 of the block 2. It will, of course, be understood that the curve 5 is a cross-sectional view of the locus of points previously referred to in any plane perpendicular to the block 2.

The plate 2 of FIG. 1 which produces the symmetrical lobar radiation pattern shown has indentations in its top surface that can be formed at least in part of walls which are substantially parallel to the axes of the straight through passages, and each indentation encompasses preferably at least tow adjacent rows of passages. The indentations can be slots as shown in my copending U.S. Pat. No. 3,179,155 or separate cavities as shown in my copending Pat. No. 3,179,157 or any other suitable form of alternating raised and depressed surfaces in a regular pattern arranged to fulfill a predetermined function.

The curve 5 can readily be compared with the dotted-line curve 9 which is theoretically representative of the locus of all the R1 points of outer surface infra-red radiation when the plate is an uninterrupted planar surface, and the curve 9 is flattened and somewhat broadened at the top when the block or plate 2 is of the conventional prior art type not having the plurality of cavities or indentations 8 formed in its upper surface.

As the percentage of cumulative port area in the block increases, the apex 6 of the curve 5 decreases in amplitude, i.e. it more closely approaches the point 4 and the total amount of straight-out radiation decreases. One object of this invention is to increase the total radiation by providing within the same area of the block considerable additional radiant wall surfaces as described, for example, in this application and also in my U.S. Pat. Nos. 3,179,155 and 3,179,157 issued Apr. 20, 1965.

An increase in the overall amount of radiation by use of the blocks or plates of my invention results from an increase in the developed surfaces of the side walls of the indentations 8 provided in the radiant surface. Because of this, there is added to the radiation in the direction parallel to the axis 7, the side wall radiation which depends partly upon the angle and design of the ceramic surface. The overall result, however, is a level of radiation intensity to either side of the axis of FIG. 1 which is greater than that directly along such axis 7 as evidenced by the depression at 6 in the curve 5. However, the increase in radiation at each of the lobes to either side of the axis 7 is so substantial that the overall radiation from the block or grid is very substantially increased as can readily be seen by comparing the overall area of the curve 5 to that of the curve 9.

Figure 2:
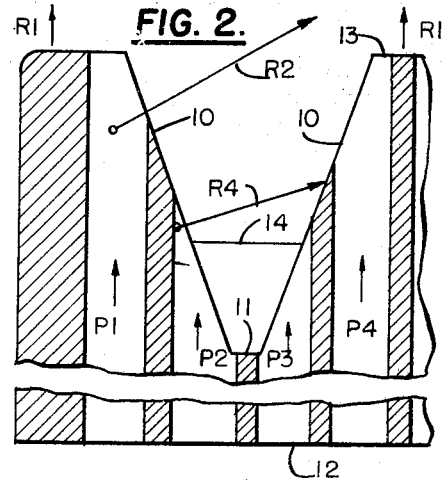
FIG. 2 illustrates a cross-sectional view of a deeply-cut symmetrical indented ceramic plate.

FIG. 2 is a cross-sectional view of one block of the present invention showing a multi-row indentation in the ceramic surface. The indentations are separated by raised high walls 10 which are formed during the press molding operation and extend above what may be termed the "opposite surface" of the block where at least a part of the gas mixture combusts, and it should be noted that the indentations encompass or straddle more than two adjacent rows of passages. While the high walls extend to the top 13 of the second boundary surface, the indentations formed between successive of the high walls are each divided into a plurality of cubicles by the intermediate height dividing walls whose top surface is at 14, and each such cubicle receives the gas flow from at least two adjacent passages, with the gas mixture burning at least in part within the outlet of the passages and overheating the raised areas which surround the opposite surface 11 and tower above such opposite surfaces. As a typical embodiment of such structure, one type thereof is shown at FIG. 2 wherein an additional beneficial effect of having the raised areas tower above the combustion surfaces 11 is the shielding of the combustion at surfaces 11 from cross-plate drafts to facilitate thereby the complete combustion of the gas mixture. In surfaces 11, 14, and 13, there may be interspersed additional passages that are at least in part cut straight by said surfaces across their axes. The indentation formed by opposing slanted side walls 10 comprises a V-type slot which includes also the bottom portion 11. Such a V-type slot intersects four adjacent rows of passages as shown, for example, by the passages designated P1–P4. It will be understood that these passages conduct a combustible gas mixture from a first boundary surface 12 of the said block toward a second boundary surface 13 for combustion adjacent to said second boundary surface. In a preferred form of my invention, as illustrated in FIG. 2, I provide cross walls 14 at spaced intervals along each V-slot formed by the opposing side walls 10. Such cross walls 14 define a plurality of cubicles along each of the multi-row indentations and in each such cubicle a plurality of passages open so that the combustible gas mixture burns in the bottom of each said cubicle.

The incandescence of the upper, secondary boundary surface 13 as combustion occurs, produces a maximum component of radiation in a direction normal to such surface 13 as represented by the arrow R1. In addition to this, there is radiation in the direction represented by the arrow R2, and such radiation emanates from the peripheral walls defining the passages such as the passages P1 and P4. There is also radiant energy emitted in the direction of the arrow R4 from the peripheral side walls defining passages such as passages P2 and P3 within the V-type slot; the radiation R4 is effective principally to increase the temperature level of the opposing peripheral walls defining the passages P3 and P4. Thus, these is a reverberatory radiation provided by the radiation R4 which, although not directly usable as emitted radiation from the block or plate is nevertheless highly useful in raising the temperature of the ceramic within the V-slot.

In FIG. 2, the directional nature of the slots has the effect of stretching the lobes of the radiation pattern curve (such as curve 5 of FIG. 1) in the plane in which such curve is inscribed and particularly parallel to the radiant surface 1 of the block 2, at the expense of the radiation pattern curve in a plane perpendicular to the plane in which such curve is inscribed. In other words, referring to FIG. 1, the apple-shaped curve 5 is elongated in the plane of the illustrated section and parallel to the upper block surface, although the radiation pattern in the direction perpendicular to that just described is foreshortened, with the total amount of radiation remaining substantially the same.

Figure 3:
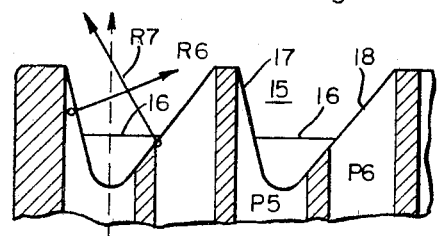
FIG. 3 is a cross-sectional view of a portion of a radiant plate or block with indentations in its radiant surface of such a nature as to produce an asymmetrical radiation pattern.

FIG. 3 is a cross-section of a radiant plate in which two rows of passages are joined by an elongated depression or slot formed in the upper combustion surface. The bottom of the slot may be continuous or may be divided into cubicles by cross walls 16 which extend for at least a portion of the depth of the slot from its bottommost portion. In FIG. 3, the cross-sectional shape of the slot is clearly shown to be of nonsymmetrical design. Thus, referring to the slot 15, it may be seen that such slot is formed in part by a side wall 17 which forms a quite small acute angle with the axis of the passage P5 and is formed also in part by an opposing side wall 18 which forms a greater angle with the axis of the adjacent passage P6. It has been found that a radiant plate constructed in accordance with the foregoing produces a radiation pattern which is of a highly asymmetrical nature.

In FIG. 3, the parallel, asymmetrical slots have the same effect of stretching the lobe or curve directionally in the plane of the section drawing. Moreover, because of the asymmetrical nature of the side walls of the slots 15 of FIG. 3, the lobe surfaces on the respective sides of the axis 7 of FIG. 1 become unequal in shape, with one of the lobes being enhanced very substantially but with the total directional radiation being nearly about the same as that which emanates from a symmetrical slot having the same total width and depth.

Figure 4:
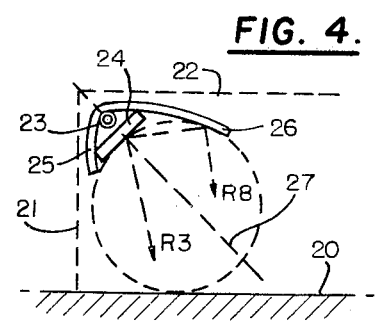
FIG. 4 is a sectional view of a radiant burner positioned overhead the space to be heated.

One of the uses for a non-symmetrical directional slotted plate of the type illustrated in FIG. 3 is for overhead radiant heaters. FIG. 4 shows a room with a floor 20, a wall 21, and a ceiling 22. Positioned overhead near the junction of the wall 21 and ceiling 22 is an overhead heater complete with gas header 23, ceramic plate or grid 24, and reflectors 25 and 26. As shown, the normal axis 27 to the surface of the slab 24 makes an angle of about 45 degrees with the vertical. It is known that the rising curtain of hot combustion gases has a tendency to reduce that portion of the total radiation which is directed above the axis 27. To overcome this, a ceramic plate 24 is used, of the general type shown in FIG. 3, having a non-symmetrical directional lobar radiation pattern in which the portion of the radiation which is affected by the exhaust curtain of combustion gases is the lesser side lobe of the issued radiation.

Figure 5:
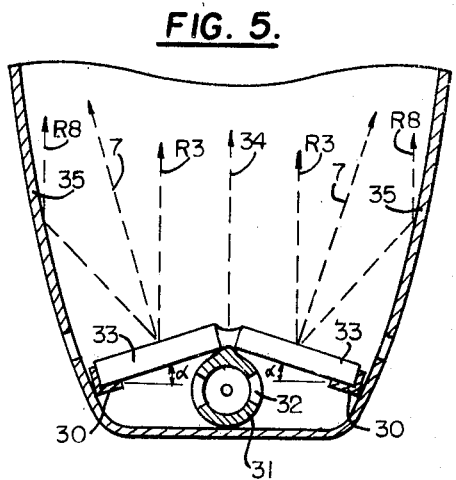
FIG. 5 is a sectional view of a directional radiation heater and projector using directional plates at an angle to each other.

FIG. 5 shows a burner having two directional radiant plates within the same housing. The plates are mounted on a common steel body 30 at one end and are supported at their other end by a tube 31 which includes a venturi 32 for atmospheric injection and gas mixing. Referring to FIG. 1, it can be noted that the highest intensity of radiation is along either of two lobes each of which makes an angle $\alpha$ with respect to the axis 7. When the improved ceramic plates of this invention are employed in a burner as in FIG. 5, each of the plates 33 is set at an angle $\beta$ to the principal axis 34 of the burner. Preferably, the angle $\beta$ equals the angle $\alpha$, in which case the angling of the plates 33 provides that one of the lobes of maximum radiation intensity is angled so as to be parallel to the axis 34 and the other lobe is then angled with an angle equal to $2\alpha$ from the axis 34 so as to be reflected by the side wall 35 of the reflector generally in the direction of the principal axis of the burner 34.

Figure 6:
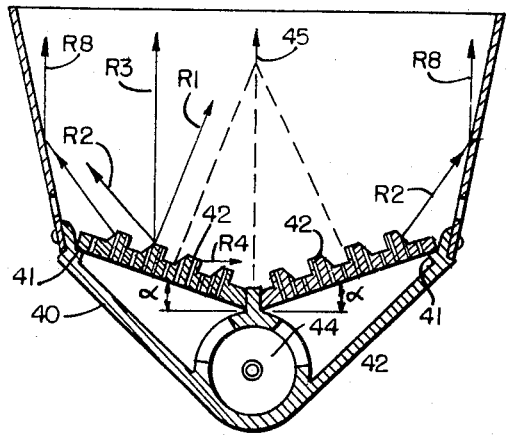
FIG. 6 is a cross-sectional view through a directional radiant heater employing asymmetrical radiant plates or blocks together with an associated reflector means.

Referring now to FIG. 6, there is shown a burner combination which again includes a framing means 40 forming an open-faced plenum and comprising supporting means 41 for one end of each of the grids or plates 42 which closes the face of the plenum. The frame 40 also supports a tube 43 including a venturi 44 for atmospheric injection and gas mixing. In FIG. 6, that end of each of the plates 42 which is toward the center of the burner is again supported by the tube through which the gas is fed and the combined supporting means for the grids 42 hold each of the grids at the angle β with respect to the principal axis 45 of the burner. Unlike FIG. 5, however, the grids are angled inwardly toward the center of the burner rather than outwardly as in FIG. 5.

Referring to the grid 42 in the left hand portion of the burner of FIG. 6, it will be noted that the radiation in the direction R1 combines with the principal side wall radiation R2 to produce a resultant radiation R3 which is generally in the direction of the axis 45 which is the principal radiation axis of the burner. By assembling each of the plates or blocks 42 at an angle β to the principal axis 45 and with angle β substantially equalling angle α, the radiation R1 which maximum is directed parallel to a normal to the plane of the block R1 is directed inwardly by the angle β toward the axis 45. At the same time, the maximum radiation which occurs in the direction R2 impinges upon the reflector walls and is reflected therefrom at an angle substantially parallel to the axis 45 as is represented by the direction of the arrow R8. In addition, the radiation in the direction of arrow R4 is directed so as to impinge upon the other block on the other side of the center line of the burner so that by mutual reverberation the temperatures of both the blocks is substantially increased.

Figure 7:
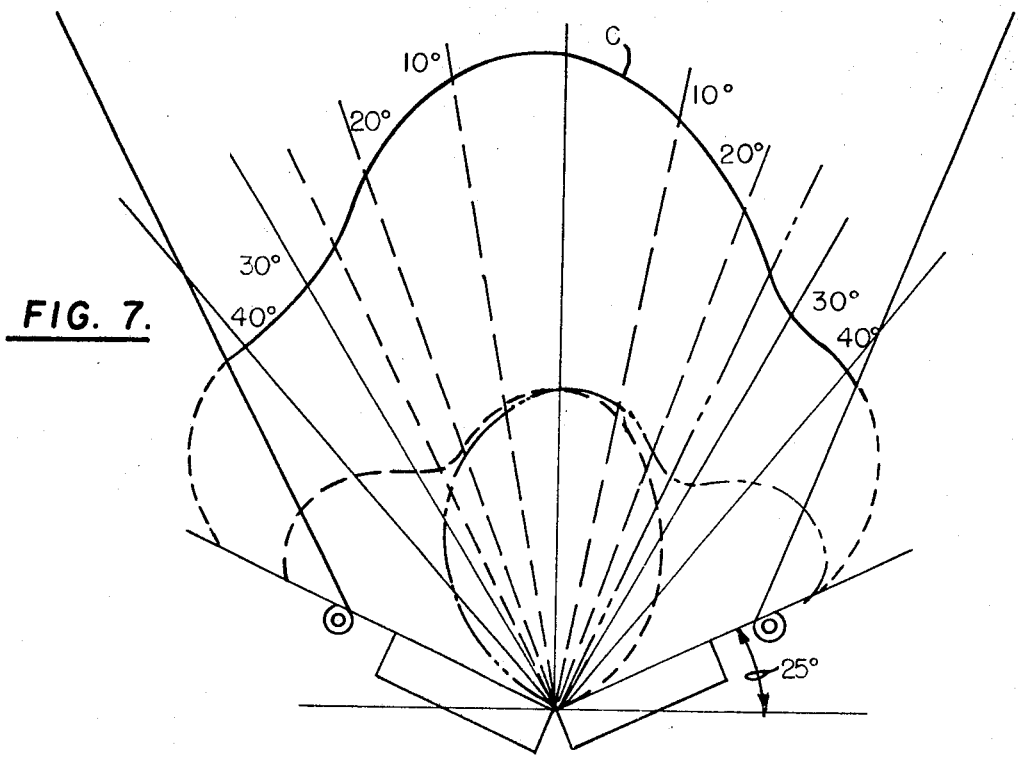
Figure 8:
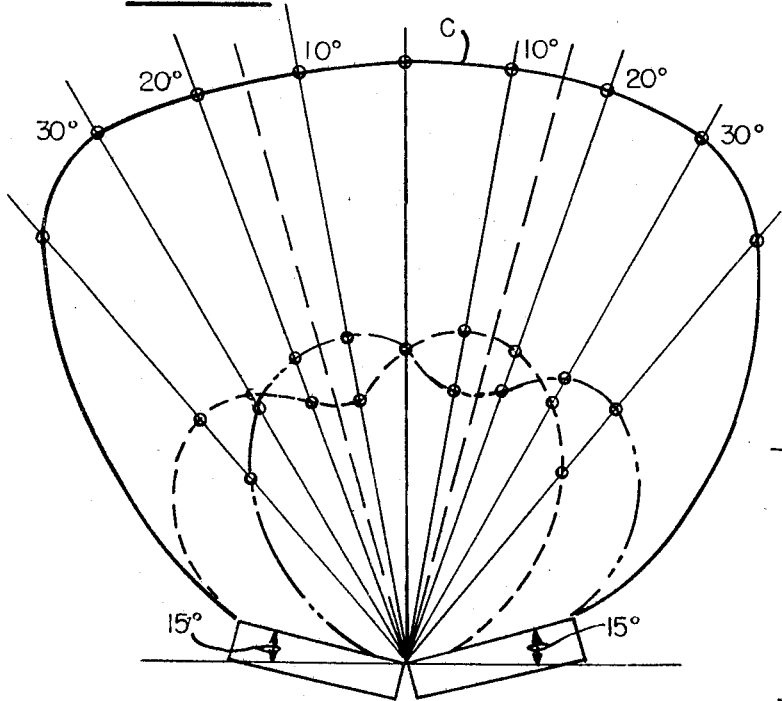
Figure 9:
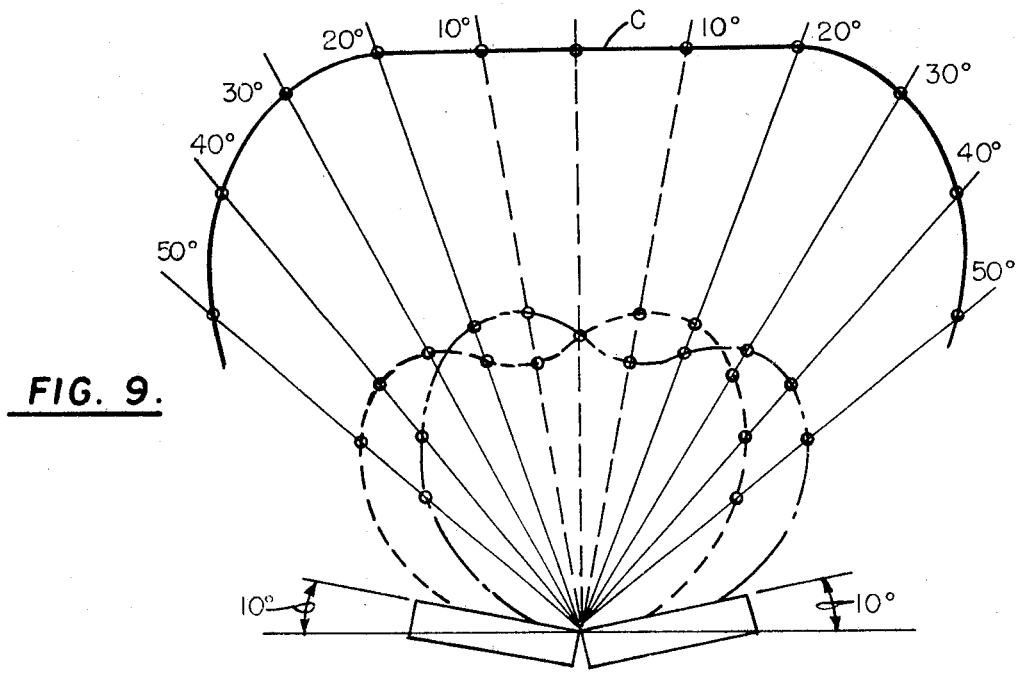
Figure 11:
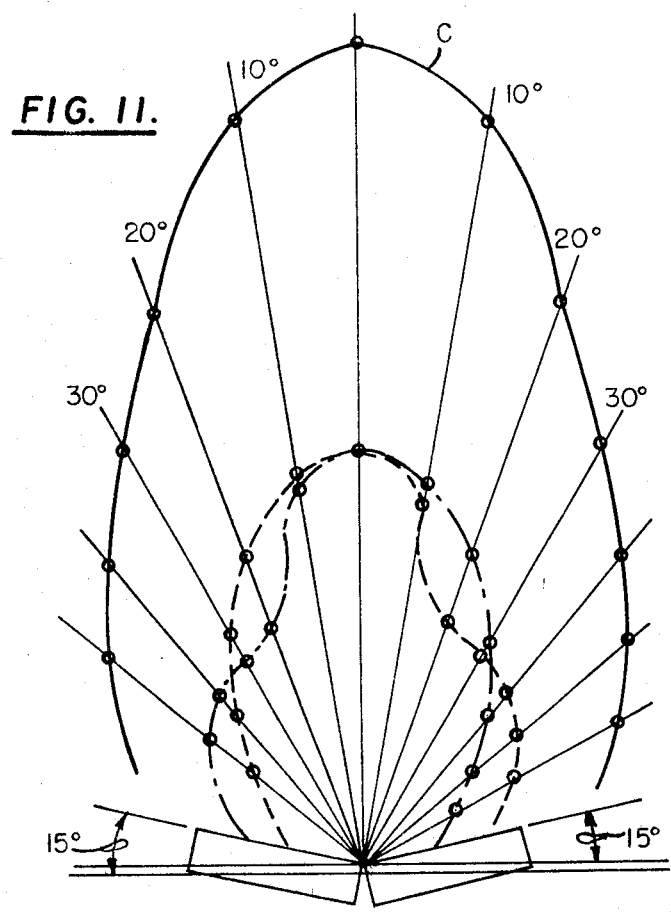
Figure 10:
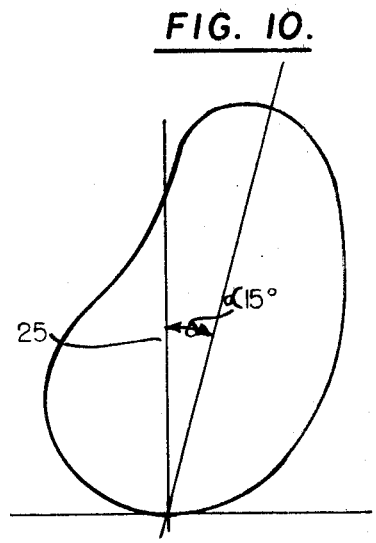

To facilitate an understanding of that aspect of the present invention which concerns the use of one or more radiant elements in a burner which are disposed closely together and which form an angle therebetween different from 180°, FIGS. 7–11 illustrate representative radiation intensity pattern curves for different dispositions of different types of radiant elements. FIGS. 7–9, as will be described more fully below, show the types of radiation intensity patterns that may be obtained by the combination of two radiant elements each having a symmetrical radiation pattern and with the radiant faces of such elements forming various angles therebetween. FIG. 10 shows the assymetrical radiation pattern that may be obtained from a radiant element constructed according to the present invention, and FIG. 11 shows the radiation pattern that may be obtained by the use of two such radiant elements of FIG. 10 when they are used in a burner and the radiant faces are directed inwardly toward each other at a predetermined angle.

FIGS. 7–9 in particular illustrate the radiation intensity pattern C which may be obtained as the result of the combining of the radiation issuing from two distinct radiant faces each having the characteristic radiation pattern shown at 5 in FIG. 1 in which the maximum intensity of radiation is illustrated as having two peaks which are symmetrically disposed at about 25° to either side of the normal to the upper planar radiant face. It will be understood that in practice, the angle α of FIG. 1 may be between 10° and 35°.

Figure 7A:
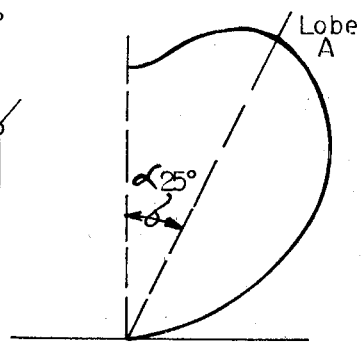

In FIG. 7, two such radiant members each having a 25° symmetrical radiant curve of the type shown in FIG. 7a are disposed so that the radiant faces of such elements are angled inwardly toward each other to form an angle therebetween of approximately 180° minus 2α or 130°. The vector addition of the radiation intensities of the two radiant elements produces a resultant curve C for the combination designated C having a distinct maximum along the principal radiation axis of the burner.

With respect to FIG. 8, the radiant elements are of the same type as in FIG. 7a, each having a characteristic angle α of approximately 25°, but the plates are now angled inwardly to a lesser degree than in FIG. 7 so that the angle therebetween is about 150°. The vectorial addition of the radiation intensities produces a significantly flatter resultant curve C than appears in FIG. 7.

In FIG. 9 the same type of plates are again employed, having a characteristic angle α of 25°, but the plates are now angled inwardly even less than in FIG. 8 so that the angle therebetween is approximately 160°. The resultant radiation curve C now is shown as having a substantially constant distribution of the radiation having intensity throughout angles extending about 25° to both sides of the principal radiation axis of the burner.

FIG. 10 shows the assymetrical radiation curve which is obtainable from a radiant member having an asymmetrical face and being of the type shown, for example, in FIG. 3. FIG. 10 shows that the maximum radiation intensity occurs at approximately an angle α equal to 15° away from the normal to the radiant face. The use of plates of this type in a burner provides a highly flexible means enabling one to design a radiant heater capable of meeting a broad range of predetermined uses.

FIG. 11 shows the type of radiation intensity curve C that may be obtained by the use of two adjacent planar radiant elements each having a radiation characteristic curve as shown in FIG. 10. Thus, in FIG. 11, the two radiant elements are directed inwardly toward each other to form an angle therebetween of approximately 150°. When positioned in this manner, the direction of maximum radiation intensity of the two radiant elements is vectorially additive so that the resultant radiation intensity along the principal axis of the burner is at a very high value, producing a narrow, elongated radiation intensity pattern which is substantially different from that shown in FIGS. 7–9.

The present invention in its most general form provides for a virtually limitless combination of radiant elements having, individually, both symmetrical and asymmetrical radiation patterns and employed together in various combinations forming various angles therebetween to produce a great variety of radiation intensity patterns for the resultant burner. It should, moreover, be understood that the invention is in no way limited in this respect to the use of ceramic surfaces but includes all types of radiant elements which are constructive to have individual radiation characteristics other than the circular type designated as 9 in FIG. 1.

Having described several embodiments of my invention, I wish it to be understood that various modifications and alterations may be made to the specific form shown without in any manner departing from the spirit or scope of this invention.

What I claim is:

1. A directional radiant heater comprising in combination, an oblong open-faced plenum, at least one foraminous ceramic plate closing the face of said plenum, means for supplying a combustible gas mixture to said plenum for flow through said foraminous plate from a first boundary surface thereof toward a second boundary surface thereof, said plate defining in its said second boundary surface a repeat pattern of spaced longitudinal transverse indentations and raised longitudinal transverse surfaces which are joined by longitudinal transverse surfaces which slope at acute angles to a normal to said second boundary surface, said sloping surfaces which are inclined to one side of said normal forming generally a different angle relative to said normal than said surfaces which are inclined toward the other side of said normal, said plate defining a multiplicity of small-bore passages extending through said plate from said first boundary surface toward said second boundary surface, at least some of said passages terminating within said sloping surfaces, whereby an asymmetrical radiation pattern in said direction transverse to the length of said indentations is produced.

2. The heater as defined in claim 1 which further includes reflector means disposed to intercept infrared radiation emitted from said sloping surfaces, said means reflecting incident radiation from said generally opposing walls in a preferred direction of said burner.

3. A radiant gas heated burner adapted to direct radiation ahead of said burner in a preferred direction,
   said burner comprising in combination two generally planar unitary radiant surface plates disposed in said burner at an angle with said preferred direction, and at angle with respect to each other,
   said radiant plates being formed of a foraminous refractory material adapted to conduct from a rear first boundary surface adjacent to a burner body which is adapted to distribute a combustible gas mixture to flow through said foraminous plate to burn at a second boundary surface to heat said second boundary surface,
   said second boundary surface having a repeat pattern of raised areas and interspersed indentations, the passages in said foraminous plates opening at least in part at the bottoms of said indentations to overheat said adjacent raised areas,
   said raised areas in both of said plates having slopes some of which being directed at least in part towards said preferred direction an said plates being supporte in part by a member common to two adjacent sides of said plates at their angular apex and being supported at the balance of their periphery by said burner body,
   means for feeding said gas mixture through a venturi, located below the support adjacent said two plates, said venturi being adapted to distribute said gas mixture evenly to both individual plates.

4. The directional burner of claim 3 in which said two plates are supported with an angle less than 180° between their respective second boundary surfaces, whereby a portion of the radiant energy of each said plate impinges upon and heats the said other plate.

5. A radiant gas heater assembly adapted to direct radiations ahead of said heater in a predetermined direction, said heater comprising in combination:
   two generally planar foraminous members,
   supporting means for positioning said members symmetrically with respect to an axis of symmetry and at an angle with said predetermined direction and at an angle with respect to each other,
   means for supplying to each of said members a gas mixture evenly distributed across their combustion surfaces to burn within the confines of and heat said combustion surfaces,
   said combustion surface of each member comprising a repetitive pattern of areas in contact with the flame of the combustion, some of which are at a level above the deeper confines of said combustion surface, some of which are minute areas alternately flat and rounded, and some of which are at an angle with the plane of said planar members, the combined radiations of each of said minute areas resulting in a radiation of greater intensity at an angle alpha from a normal to said member than along said normal,
   said supporting means positioning each said member such that its direction of greater radiation intensity generally coincides with said predetermined direction, said two plates being supported with an angle greater than 180° between their respective second boundary surfaces, reflector means located at two opposite sides of said two plate assembly, said reflector means positioned to have a portion of the radiant energy of each said plate impinge thereupon and be reflected in a direction generally along said principal radiation axis.

6. A radiant gas heater adapted to direct a concentrated beam of radiation in a preferred direction ahead of said burner and comprising in combination:
   at least one generally planar foraminous member,
   means for conducting a combustible gas mixture to a combustion surface of said foraminous member for combustion adjacent said combustion surface,
   said combustion surface being formed in part of surfaces which slope at acute angles relative to a normal to the plane of said foraminous member, said sloping surfaces being disposed to form a lobar radiation intensity pattern having maxima at acute angles to either side of said normal,
   mounting means for positioning said member such that said normal forms an acute angle with said preferred direction and one of said two maxima of said lobar radiation pattern generally lies along said preferred direction,
   and reflector means positioned to have the radiation along the other of said maxima of said lobar radiation pattern impinge thereon and be reflected outwardly generally in said preferred direction.

7. In a gas heated radiant burner, a radiant grid element comprising:
   (a) a unitary block of refractory heat insulating material having a myriad of minute-bore passages which extend from an inlet end at a first boundary surface of said block toward the opposite surface of said block for conducting from said first surface a myriad of streams of a combustible gas mixture for combustion adjacent said opposite surface,
   (b) said block having formed in said opposite surface a close repeat pattern of discrete raised walls and intervening indentations each of which intersects at least two of said passages,
   (c) the total number of said raised areas in said block surface being sub-divided in at least one direction by a smaller number of substantially higher walls generally transverse to said raised walls towering above said closely grouped discrete raised areas,
   (d) said higher walls being adapted to protect said discrete raised areas against cooling effects of cross plate convection cooling air currents.

8. As claim 7, said higher walls being for the most part directed parallel with at least one edge of said block and a reflector facing said higher walls.

9. In a radiant gas burner, a radiant grid element comprising:
   (a) a unitary block or refractory heat insulating material having a myriad of minute-bore passages which extend from an inlet end at a first boundary surface of said block toward an opposite surface thereof for conducting from said first surface a myriad of streams of a combustible gas mixture,
   (b) at least some of said passages opening adjacent said opposite surface for combustion adjacent said surface,
   (c) said block having formed over said opposite surface a repetitive pattern of raised walls extending upwardly from said opposite surface to an intermediate level of said block and lying within the path of the combustion flames originating adjacent said opposite surface,
   (d) said block also having formed laterally of said opposite surface a repetitive pattern of upstanding high walls which extend from said opposite surface to a higher level than said raised walls and disposed generally transverse to said raised walls,
   (e) said high walls shielding both said opposite surface and said intermediate height raised walls from the cooling effect of cross-plate convection currents.

10. The gas burner of claim 9 in which said higher walls are integral with and extend laterally of said plate in a direction generally parallel with an edge of said block, said burner including at least one reflector generally facing said higher walls to project radiant energy ahead of said burner.

11. In a radiant gas burner:
(a) an oblong open-faced plenum,
(b) at least one ceramic plate closing the face of said plenum and defining therein a multiplicity of minute through passages,
(c) means for supplying a combustible gas mixture to said plenum for flow through said passages from a first boundary surface thereof toward a second boundary surface thereof,
(d) said second boundary surface being defined at least in part by a repetitive pattern of alternate depressed and raised portions joined by upstanding portions which extend longitudinally across said second boundary surface of said plate generally parallel to opposite edges thereof,
(e) some of said upstanding portions generally facing one of said opposite edges and the others of said upstanding portions generally facing the other of said opposite edges,
(f) said some upstanding portions being disposed at a different angle to the axes of said passages than said other upstanding portions to provide thereby a radiation pattern which is asymmetrical in a plane perpendicular to said opposite edges.

12. The gas burner of claim 11 in which at least some of said upstanding surfaces are substantially planar.

13. The gas burner of claim 11 in which at least some of said upstanding surfaces are curved.

14. The gas burner as defined in claim 11 in which said plenum is formed to support over its open face two said plates so disposed as to have adjacent edges parallel to each other but with the upper radiant faces thereof forming an angle therebetween, said plates being placed on said plenum in respectively reversed positions so as to have said some upstanding surfaces on both said plates generally facing each other and said other upstanding surfaces on the respective plates generally facing outwardly away from each other.

15. A radiant heater comprising in combination, an oblong open-faced plenum, at least one foraminous ceramic plate closing the face of said plenum, means for supplying a combustible gas mixture to said plenum for flow through said foraminous plate from a first boundary surface thereof toward a second boundary surface thereof, said plate defining in its said second boundary surface a repeat pattern of surfaces at least some of which slope at acute angles to a normal to said second boundary surface, said plate defining a multiplicity of small-bore passages occurring closely together in closely spaced rows and extending through said plate from said first boundary surface toward said second boundary surface, at least some of said passages terminating at least in part within said sloping surfaces, generally opposed pairs of said sloping surfaces forming repetitive indentations in said second boundary surface and having a pitch of sufficient magnitude in one direction over said second boundary surface so as to encompass at least three successive rows of said passages, whereby the infrared radiation pattern from said plate resulting from burning of said combustible gas mixture at said second boundary surface and within said indentations thereby producing incandescence of said second boundary surface and of said generally opposing walls is lengthened in a direction transverse to said indentations.

16. The radiant heater as in claim 15 which at least some of said sloping surfaces are planar and are generally parallel to the axes of said passages.

17. A radiant gas heater adapted to direct a concentrated beam of radiation whose maximum intensity lies along a predetermined direction ahead of said burner and comprising in combination:
at least one planar foraminous member individually supported by a burner body and having an inner face adapted to distribute a combustible gas mixture through passages of generally circular cross section whose path is generally normal to said member to an outer face thereof for combustion within said outer face,
said outer face including means comprising a multiplicity of elemental surfaces at acute angles to a normal to said face and being so located and disposed as to form a radiation intensity pattern having at least one maximum intensity of radiation at an angle to said normal and a lesser radiation intensity along said normal,
and means for supporting said foraminous member in said heater to cause said normal to form a selected angle with said predetermined direction so that said maximum intensity of radiation of said foraminous member is angled toward said predetermined direction, each said foraminous member having its said multiplicity of elemental surfaces so arranged and disposed as to produce a bi-lobar radiation intensity pattern with said lobes being of unequal intensity and disposed on opposite sides of said normal to said outer face,
said supporting means supporting said members with an angle therebetween of less than 180° selected to produce substantial superimposition of the lobes of the respective members, and reflector means disposed so as to have impinge thereupon the radiant energy from said foraminous members along one of the respective lobes of each of said member and reflect said radiant energy generally in said predetermined direction.

18. The radiant heater of claim 6 in which at least some of said sloping surfaces are substantially parallel to said normal.

19. A directional gas-heated radiant burner adapted to radiate heat in a preferred direction toward a limited operational area comprising in combination:
an open-faced plenum,
at least two generally planar ceramic plates closing the face of said plenum,
said plate having a multiplicity of through passages of minute-bore, used for conducting a combustible gas mixture from said plenum through said passages to the combustion surfaces of said plate,
said combustion surface of each said plate being formed of alternate raised areas and intervening indentations,
many of said through passages having a portion of their peripheral walls cut away at the point of emergence of said passages into said combustion surface to expose thereby a portion of the interior wall of said passages,
a plurality of said exposed interior walls generally facing in the same direction to form a cumulative radiant surface which emits infrared radiation at a direction transverse to a direct radiation component emitted from said raised area and intervening indentations to provide thereby a radiation intensity pattern having at least one maximum which is directed at an acute angle alpha from a normal to said plate,
means for mounting each said plate in said burner with said normal or said plate forming an acute angle substantially equal to such angle alpha to said preferred direction such that said resultant radiation component of each plate substantially parallels said preferred direction, the normal to said plates forming an angle relative to each other which substantially equals twice the angle alpha.

20. A radiant gas heater (FIG. 5) adapted to direct a concentrated beam of radiation whose maximum intensity lies along a predetermined direction (34) ahead of said burner and comprising in combination:
at least one planar foraminous member (33) individually supported by a burner body (35) and having an inner face adapted to distribute a combustible gas mixture through passages of generally circular cross section whose path is generally normal to said member to an outer face thereof for combustion within said outer face, said outer face including means comprising a multiplicity of elemental surfaces (10) (FIG. 2) at acute angles to a normal to said face and being so located an disposed as to form a radiation intensity pattern having at least one maximum intensity of radiation at an angle to said normal, a lesser radiation intensity along said normal, and means (30) for supporting said foraminous member in said heater to cause said normal to form a selected angle with said predtermined direction so that said maximum intensity of radiation of said foraminous member is angled toward said predetermined direction, each said foraminous member having its said multiplicity of elemental surfaces so arranged and disposed as to produce a bi-lobar radiation intensity pattern with said lobes being of unequal intensity and disposed on opposite sides of said normal to said outer face, said supporting means supporting said members with and angle therebetween of less than 180° selected to produce substantial superimposition of the lobes of the respective members.

References Cited

UNITED STATES PATENTS

| | | | |
|---|---|---|---|
| 1,231,750 | 7/1917 | Kuhn et al. | 219—347 |
| 1,577,434 | 3/1926 | Kempston et al. | 219—377 |
| 2,051,213 | 8/1936 | Hamilton. | |
| 2,832,331 | 4/1958 | Schwank. | |
| 3,114,363 | 12/1963 | Koltun | 158—99 |
| 3,170,504 | 2/1965 | Lanning | 158—116 |
| 3,179,155 | 4/1965 | Partiot | 158—116 |

FOREIGN PATENTS

| | | |
|---|---|---|
| 558,007 | 6/1957 | Belgium. |
| 905,529 | 9/1962 | Great Britain. |
| 916,831 | 1/1963 | Great Britain. |
| 842,596 | 7/1960 | Great Britain. |

FREDERICK L. MATTESON, JR., Primary Examiner

H. B. RAMEY, Assistant Examiner